United States Patent [19]
Watanabe et al.

[11] Patent Number: 5,574,809
[45] Date of Patent: Nov. 12, 1996

[54] OPTICAL FIBER TYPE PART FOR OPTICAL SYSTEMS

[75] Inventors: Toshiaki Watanabe; Toshihiko Ryuo, both of Gunma, Japan

[73] Assignee: Shin-Etsu Chemical Co., Ltd., Tokyo, Japan

[21] Appl. No.: 502,627

[22] Filed: Jul. 14, 1995

[30] Foreign Application Priority Data

Aug. 1, 1994 [JP] Japan .................................. 6-179356

[51] Int. Cl.$^6$ ................................................ G02B 6/32
[52] U.S. Cl. .................. 385/31; 385/33; 385/38
[58] Field of Search .......................... 385/11, 15, 24, 385/31, 33, 34, 35, 38, 39, 73, 74

[56] References Cited

U.S. PATENT DOCUMENTS 5,040,863  8/1991  Kawakami et al. .................... 385/31
5,195,155  3/1993  Shimaoka et al. ...................... 385/33
5,208,876  5/1993  Pan ............................................ 385/11

*Primary Examiner*—John Ngo
*Attorney, Agent, or Firm*—McAulay Fisher Nissen Goldberg & Kiel, LLP

[57] ABSTRACT

An optical fiber type part for optical systems which comprises a smaller number of parts, whose production does not require a long time and which has stable optical characteristics is herein provided. The optical fiber type part for optical systems comprises an optical element 9, first and second lenses and each arranged on the light-incident or light-outgoing side of the optical part and first and second optical fibers and each arranged on the light-incident side of the first lens and the light-outgoing side of the second lens respectively and is characterized in that the end faces of the first and second optical fibers which are opposed to one another are inclined at an angle and subjected to abrasive finishing and that anti-reflection films are formed on these end faces.

5 Claims, 1 Drawing Sheet

5,574,809

OPTICAL FIBER TYPE PART FOR OPTICAL SYSTEMS

BACKGROUND OF THE INVENTION

The present invention relates to an optical fiber type part for optical systems which makes use of an optical part such as an optical isolator or an optical circulator and which can be used in optical communication and optical measurement systems.

If light rays emitted from a light source are transmitted through an optical system, a part of the light rays are reflected by the end faces of the optical system and the reflected light rays come back to the light source. In transmitting signals through an optical fiber, for instance, a light beam emitted from a laser is projected on the end face of the optical fiber through lenses and the majority thereof is transmitted through the optical fiber as the transmitted light, but a part thereof undergoes surface reflection on the surfaces of the lenses and/or the end face of the fiber and come back to the laser. This leads to disturbance of the laser oscillation and becomes a cause of generating noises. An optical isolator or an optical circulator is in general used for preventing or eliminating the generation of such noises. An optical fiber type part for optical systems generally comprises a combination of an optical element such as an optical isolator or an optical circulator with an optical system.

If the refractive index of the usual glass is assumed to be 1.5, 4% of the incident light rays per end face of a glass part is reflected due to the difference between the refractive indices of the glass and the air (refractive index: 1.0) and this corresponds to a loss of the transmittance equal to 0.177 dB per end face. An optical isolator or an optical circulator usually has two end faces and accordingly, the loss is accordingly equal to 0.354 dB in all. In general, when spatially transmitting light rays through an optical fiber system such as an optical isolator or an optical circulator, the loss observed during such transmission comprises the coupling loss due to the lens system ranging from 0.3 to 0.4 dB, the transmission loss within the optical isolator or optical circulator ranging from 0.1 to 0.2 dB and the loss due to the reflection by the end faces of the optical fiber ranges from 0.5 to 0.7 dB. The generation of a transmission loss on the order of not less than 0.35 dB greatly affects the light transmission and therefore, a part provided with an anti-reflection film must be fitted to the end surfaces of optical fibers to thus eliminate such a transmission loss.

As shown in FIG. 2, a conventional optical fiber type part 10 for optical systems comprises an optical element 9 such as an optical isolator or an optical circulator and a first optical fiber 1 and a second optical fiber 2 arranged on the light-incident side and the light-outgoing side of the optical element 9 through a first lens 11 and a second lens 12 respectively. The end faces of the first and second optical fibers 1 and 2 which are opposed to one another are subjected to abrasive finishing to minimize the quantity of reflected light and to reduce the coupling loss observed for optical coupling and further first and second glass parts 5 and 6 provided with anti-reflection films 7 and 8 respectively are adhered to the corresponding end faces of the optical fibers through adhesive layers 3 and 4, respectively. When this optical fiber type part 10 is practically used, a laser is, for instance, connected to the first optical fiber 1, while a photodiode is, for instance, connected to the second optical fiber 2.

The laser light rays which outgo through the end face of the first optical fiber 1 are converted into light rays approximately parallel to the forward direction during transmitting through the first glass part 5 and the first lens 11 and the light rays are then incident upon the optical isolator 9. The parallel light rays which transmit through and outgo from the optical isolator 9 are condensed into a small-sized beam by the action of the second lens 12, transmit through the second glass part 6 and the majority thereof is incident upon the second optical fiber 2. The light rays condensed by the second lens 12 are incident upon the second glass part 6 without undergoing any reflection due to the presence of the anti-reflection film 8 formed on the second glass part 6 and accordingly, the loss observed on the end face is limited to a very low level on the order of 0.031 to 0.013 dB.

However, the conventional optical fiber type optical part 10 suffers from a variety of drawbacks. For instance, the quantity of transmitting light rays is reduced and the coupling loss in turn increases since air is mixed in the adhesive layers 3 and 4 and the optical path length of the transmitting light rays varies depending on the amount of the adhesive, the angle between the optical axis and the first and second glass parts 5 and 6 adhered to the end faces of the optical fibers 1 and 2 respectively or the environmental temperature and accordingly, the optical characteristics of the optical part are unstable and undergo changes. Moreover, the production of the part 10 takes a long time and becomes expensive since the production thereof requires a process for adhering fine parts such as the first and second glass parts 5 and 6.

SUMMARY OF THE INVENTION

The present invention has been developed for the purpose of solving the foregoing problems and thus it is an object of the present invention to provide an optical fiber type part for optical systems exhibiting stable optical characteristics, whose production does not require a long time since the production thereof does not require the use of any glass part provided with an anti-reflection film and any adhesive.

According to the present invention, the foregoing object can effectively be accomplished by providing an optical fiber type part for optical systems which comprises an optical element, first and second lenses each arranged on the light-incident or light-outgoing side of the optical element and first and second optical fibers each arranged on the light-incident side of the first lens and the light-outgoing side of the second lens respectively, wherein the end faces of the first and second optical fibers which are opposed to one another are inclined at an angle and subjected to abrasive finishing and anti-reflection films are formed on these end faces.

DETAILED DESCRIPTION OF THE INVENTION

Figure 1:
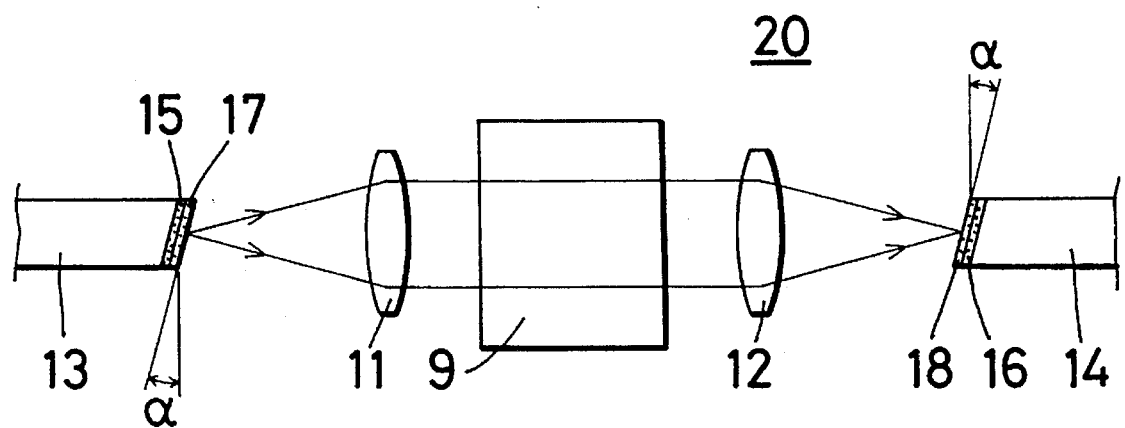
FIG. 1 is a schematic block diagram showing an embodiment of the optical fiber type part for optical systems according to the present invention.
Figure 2:
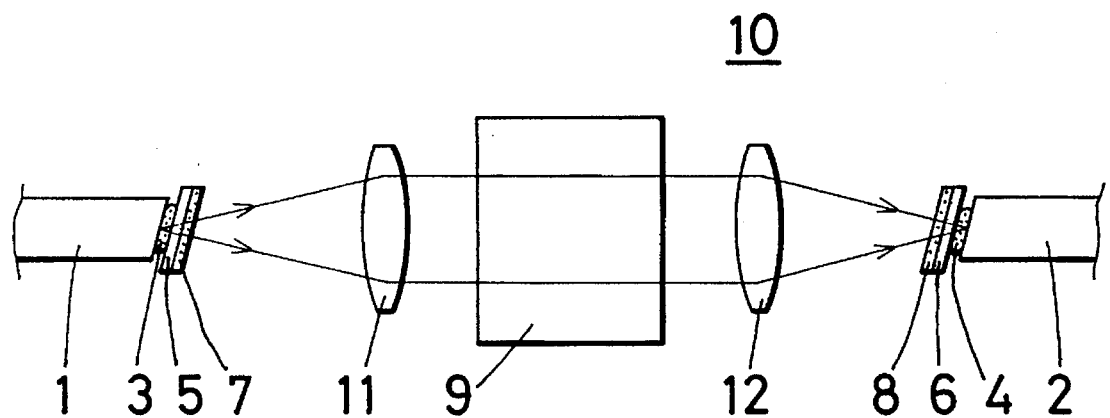
FIG. 2 is a schematic block diagram showing an embodiment of the conventional optical fiber type part for optical systems.

As will be seen from FIG. 1, the optical fiber type part for optical systems 20 according to the present invention comprises first and second optical fibers 13 and 14 whose end faces opposed to one another are inclined at an angle and subjected to abrasive finishing and are provided with anti-reflection films each comprising two layers, i.e., an inner layer 15 or 16 and a surface layer 17 or 18.

For this reason, the forward light rays which outgo through the end face of the first optical fiber 13 do not undergo any reflection when the light rays transmit through the first lens 11, the optical element 9 and the second lens 12 and are, in turn, incident upon the second optical fiber 14.

The present invention will hereinafter be explained in more detail with reference to the following embodiments, but the present invention is by no means limited to these specific embodiments and these embodiments may appropriately be modified.

Embodiment

FIG. 1 is a schematic block diagram showing an embodiment of the optical fiber type part for optical systems 20 according to the present invention. As will be seen from FIG. 1, an optical isolator 9 is secured within a ceramic ferrule, a first lens 11 for making the light rays emitted from a light source approximately parallel and for making the parallel light rays incident upon the optical isolator 9 is arranged on the light-incident side of the isolator 9 and a second lens 12 for condensing the light rays outgoing from the isolator 9 is arranged on the light-outgoing side of the isolator 9. Moreover, a first optical fiber 13 for transmitting and guiding the light rays from the source is positioned on the light-incident side of the first lens 11 and a second optical fiber 14 upon which the light rays condensed by the second lens 12 are incident is positioned on the light-outgoing side of the second lens 12. The first and second optical fibers 13 and 14 are optical fibers for optical communication each having a desired length although the majority thereof is herein omitted. The first optical fiber 13 is connected to, for instance, a laser (not shown), while the second optical fiber 14 is connected to, for instance, a photodiode (not shown).

Each of the end surfaces of the first and second optical fibers 13 and 14 which are opposed to one another and positioned on the sides of the optical isolator 9 is inclined at an angle α of 8° and subjected to abrasive finishing and 0 an anti-reflection film comprising two layers, i.e., an inner layer 15 or 16 and a surface layer 17 or 18 is deposited on the abrasive-finished end face using a vapor-deposition apparatus. The inner layer 15 or 16 is formed from $TiO_2$, while the surface layer 17 or 18 is formed from $SiO_2$.

The optical fiber type part for optical systems 20 according to the present invention can operate in the following manner. The laser light rays outgoing from the first optical fiber 13 are converted into light rays approximately parallel to the forward direction by the action of the first lens 11 during transmitting therethrough and are incident upon the optical isolator 9. The parallel light rays transmitting through and outgoing from the isolator 9 are then condensed into a light beam having a small diameter by the action of the second lens 12. Thus, the majority of the light beam is incident upon the second optical fiber 14.

The optical fiber type part for optical systems 20 thus constructed was inspected for the coupling loss, the backward loss and the return loss observed at the end face of the second optical fiber 14. As a result, it was found that the part 20 showed only a low transmission loss. More specifically, the coupling loss, the backward loss and the return loss were found to be 0.55 dB, 65 dB and not less than 65 dB, respectively. On the other hand, there was assembled an optical fiber type part for optical systems 20 having the same structure assembled above except that an optical circulator was substituted for the optical isolator 9 and it was found that the resulting optical part likewise showed only a low transmission loss.

Separately, there was also assembled an optical fiber type part for optical systems 20 having the same structure assembled above except that first and second optical fibers free of any anti-reflection film were substituted for the first and second optical fibers 13 and 14 and the resulting optical part was likewise inspected for the coupling loss, the backward loss and the return loss observed at the end face of the second optical fiber free of any anti-reflection film. As a result, the coupling loss, the backward loss and the return loss were found to be 0.86 dB, 65 dB and 62 dB, respectively. In other words, the comparative optical part showed a transmission loss higher than that observed for the part comprising the first and second optical fibers 13 and 14.

As has been described above in detail, the optical fiber type part for optical systems according to the present invention requires a smaller number of parts since it does not comprise glass parts provided with anti-reflection films and does not require the use of any adhesive. Therefore, the production thereof does not take a long time and accordingly, the cost of the part can be reduced. In addition, the optical part shows only low losses such as the coupling loss and exhibits stable optical characteristics.

What is claimed is:

1. An optical fiber part for optical systems which comprises an optical element, first and second lenses each arranged on the light-incident or light-outgoing side of the optical element and first and second optical fibers each arranged on the light-incident side of the first lens and the light-outgoing side of the second lens respectively, wherein the end faces of the first and second optical fibers which are opposed to one another are inclined at an angle and have abrasive finish and anti-reflection film on each end face, wherein the anti-reflection film comprising an inner layer and a surfaced layer, and wherein the inner layer is formed from $TiO_2$ and the surface layer is formed from $SiO_2$.

2. The optical fiber type part for optical systems according to claim 1 wherein the optical element is an optical isolator or an optical circulator.

3. The optical fiber part of claim 1 wherein the end faces of the first and second optical fibers are inclined to the optical axis thereof.

4. The optical fiber part of claim 1 wherein the optical element is an optical isolator.

5. The optical fiber part of claim 1 wherein the optical element is an optical circulator.

* * * * *